UNITED STATES PATENT OFFICE.

LOUIS S. ROBBINS, OF BROOKLYN, NEW YORK.

IMPROVEMENT IN FERTILIZING COMPOUNDS.

Specification forming part of Letters Patent No. 17,392, dated May 26, 1857.

*To all whom it may concern:*

Be it known that I, LOUIS S. ROBBINS, of Brooklyn, Kings county, and State of New York, have invented a new and Improved Fertilizer; and I do hereby declare that the following is a full and exact description thereof.

The nature of my invention consists in a new composition of matter obtained by mixing the superphosphate of lime with green sand of a certain quality and in certain proportions, depending upon the soil to which it is to be applied.

To enable others skilled in the art to make and use my invention, I will proceed to describe the process of manufacture.

I procure a quality of green sand which contains very little or no carbonate of lime, which I cause to be dried sufficiently to admit of its being ground into a powder. I then mix with it superphosphate of lime in the proportion of two parts of the former to one of the latter, when I proceed to grind the mixture, during which process the two substances become thoroughly mingled together and pulverized to a degree of fineness by which they become readily assimilated to the plant. This fertilizer thus obtained is to be applied to the soil in the same manner as guano or other manures.

I employ for the manufacture of the superphosphate of lime the Columbian guano, or any other substance known to contain the phosphate of lime.

I do not claim the separate use of superphosphate of lime or of green sand; but

What I do claim as my invention, and desire to secure by Letters Patent, is—

The new composition of matter obtained by the intimate mixture of green sand and superphosphate of lime in a finely-pulverized form, for the purpose specified.

LOUIS S. ROBBINS.

Witnesses:
THOMAS DONN,
JOS. I. FOWLER.